(12) United States Patent
Mortimer

(10) Patent No.: US 7,391,355 B2
(45) Date of Patent: Jun. 24, 2008

(54) SINGLE PLATFORM GEOLOCATION METHOD AND APPARATUS

(75) Inventor: Thomas J. Mortimer, Amherst, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 60 days.

(21) Appl. No.: 10/593,806

(22) PCT Filed: Jun. 9, 2005

(86) PCT No.: PCT/US2005/020192

§ 371 (c)(1),
(2), (4) Date: Sep. 21, 2006

(87) PCT Pub. No.: WO2006/085916

PCT Pub. Date: Aug. 17, 2006

(65) Prior Publication Data

US 2007/0273571 A1 Nov. 29, 2007

Related U.S. Application Data

(60) Provisional application No. 60/579,088, filed on Jun. 11, 2004.

(51) Int. Cl.
*G01S 7/38* (2006.01)
(52) U.S. Cl. .............................. 342/13; 342/14; 342/15; 342/107; 342/113; 342/95

(58) Field of Classification Search ............. 342/13–19, 342/9, 58, 95–97, 104, 107, 113
See application file for complete search history.

(56) References Cited

U.S. PATENT DOCUMENTS

| | | | |
|---|---|---|---|
| 3,618,096 A * | 11/1971 | Schoneborn .................. 342/14 |
| 4,991,144 A * | 2/1991 | Geren et al. ................... 367/1 |
| 5,708,443 A | 1/1998 | Rose | |
| 6,067,041 A | 5/2000 | Kaiser et al. | |
| 6,114,984 A | 9/2000 | McNiff | |
| 6,255,992 B1 | 7/2001 | Madden | |
| 6,429,800 B1 * | 8/2002 | Richmond ..................... 342/14 |
| 6,492,931 B1 * | 12/2002 | Blitz ............................ 342/15 |
| 6,535,816 B1 | 3/2003 | Smith | |
| 7,213,496 B2 * | 5/2007 | Perricone ..................... 89/1.11 |
| 2002/0097184 A1 | 7/2002 | Mayersak | |
| 2002/0126043 A1 | 9/2002 | Martinerie et al. | |
| 2007/0273571 A1* | 11/2007 | Mortimer ...................... 342/13 |

* cited by examiner

Primary Examiner—John B Sotomayor
(74) Attorney, Agent, or Firm—Bourque & Associates, P.A.

(57) ABSTRACT

A geolocation system and method uses a single platform for determining a Doppler measurement set of a targeted aircraft or signal of interest. The electronic warfare aircraft and the ejected aircraft expendables technology device determine the Doppler measurement set of the targeted aircraft or other signal of interest. The ejected aircraft expendables technology device is initially tuned to an expected frequency of the target of interest. Re-tuning may take place after an initial signal reading and computation has been performed by the electronic warfare aircraft.

38 Claims, 3 Drawing Sheets

SINGLE PLATFORM GEOLOCATION METHOD AND APPARATUS

CROSS-REFERENCE TO RELATED APPLICATIONS

This application claims the benefit of U.S. Provisional Application Ser. No. 60/579,088, filed Jun. 11, 2004.

TECHNICAL FIELD

The present invention relates to single platform geolocation methods and more particularly to methods for determining a Doppler measurement set of a targeted aircraft via an electronic warfare aircraft and an aircraft expendables technology device.

BACKGROUND INFORMATION

Presently, there are methods that use dual platforms to obtain angle and range data relating to a radio frequency emitting energy source. The range is determined by an intersection on multiple lines of bearings. These methods are known as Differential Velocity Interferometry (DVI) techniques. Specifically, the Differential Velocity Interferometry (DVI) methods utilize a pair of electronic warfare aircraft P1 and P2, FIG. 1, flying at known velocities to compute a set of possible contours 5 that satisfy an emitter location 3.

Obviously, a mission having two platforms P1, P2 is very expensive and complex. Further, the accuracy, proximate the platforms, is not good. In addition, the mission geometries, such as platform separation, platform coordination, and platform timing are difficult to control. In summary, allocating and coordinating two electronic warfare aircrafts P1, P2 to perform an electronic warfare mission are complex and expensive tasks. Accordingly, there is a need for a less complex and less expensive method of geolocating a target.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

According to one embodiment, the present invention features a portable single platform geolocation method for determining a Doppler measurement set of a target of interest. The method includes providing an electronic warfare aircraft having an aircraft expendables technology device on-board, within a signal range of the target of interest. Next, the electronic warfare aircraft performs an initial frequency measurement of the target of interest. A receiver in the aircraft expendables technology device is tuned and programmed based on the initial frequency measurement of the target of interest. The aircraft expendables technology device is ejected from the electronic warfare aircraft into airspace within the signal of range of the target of interest and performs a Doppler measurement set on the target of interest. The Doppler measurement set of the target of interest is then transmitted from the aircraft expendables technology device to the electronic warfare aircraft.

In the preferred embodiment, time and position references of the aircraft expendables technology device are determined and transferred from the aircraft expendables technology device to the electronic warfare aircraft. These measurements are then utilized to determine a time difference of arrival measurement. Optionally, the receiver of the aircraft expendables technology device is returned to a new target of interest in response to at least one received signal from the target of interest.

According to another embodiment, the present invention features a method of performing geolocation from a single platform. In the preferred embodiment, the first aircraft performs an initial frequency measurement of a signal of interest and a receiver disposed within an aircraft expendable technology device is tuned. The aircraft expendable technology device is ejected from a first aircraft and a first set of Doppler measurements are performed using hardware disposed on the first aircraft. At least a second set of Doppler measurements are performed using hardware disposed on the aircraft expendable technology device and are transmitted from the aircraft expendable technology device to the first aircraft.

According to yet another embodiment, the present invention features a signal platform geolocation system. The system includes a first aircraft and an aircraft expendable technology device. The first aircraft includes a first COMS transponder and a first receiver. The first COMS transponder generates a first set of Doppler measurements. The aircraft expendable technology device is releaseably secured to the first aircraft and includes a second COMS transponder and a first transmitter. The second COMS transponder generates a second set of Doppler measurements and the first transmitter transmits data relevant to the second set of Doppler measurements from the aircraft expendable technology device to the first receiver of the first aircraft.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 2:
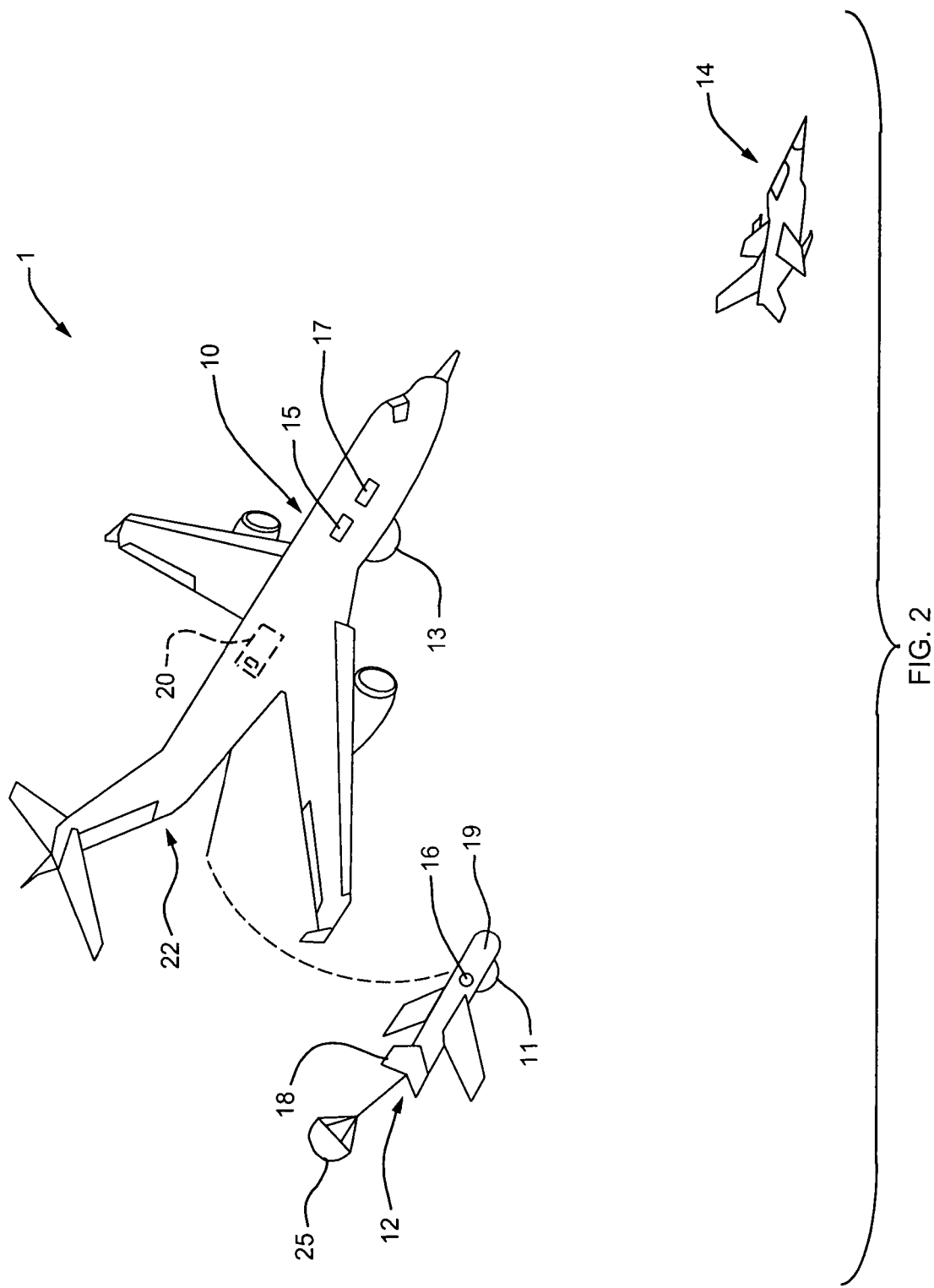
FIG. 2 is a single platform geolocation system showing an electronic warfare aircraft ejecting an aircraft expendables technology device for tracking a targeted aircraft, according to the present invention.
Figure 3:
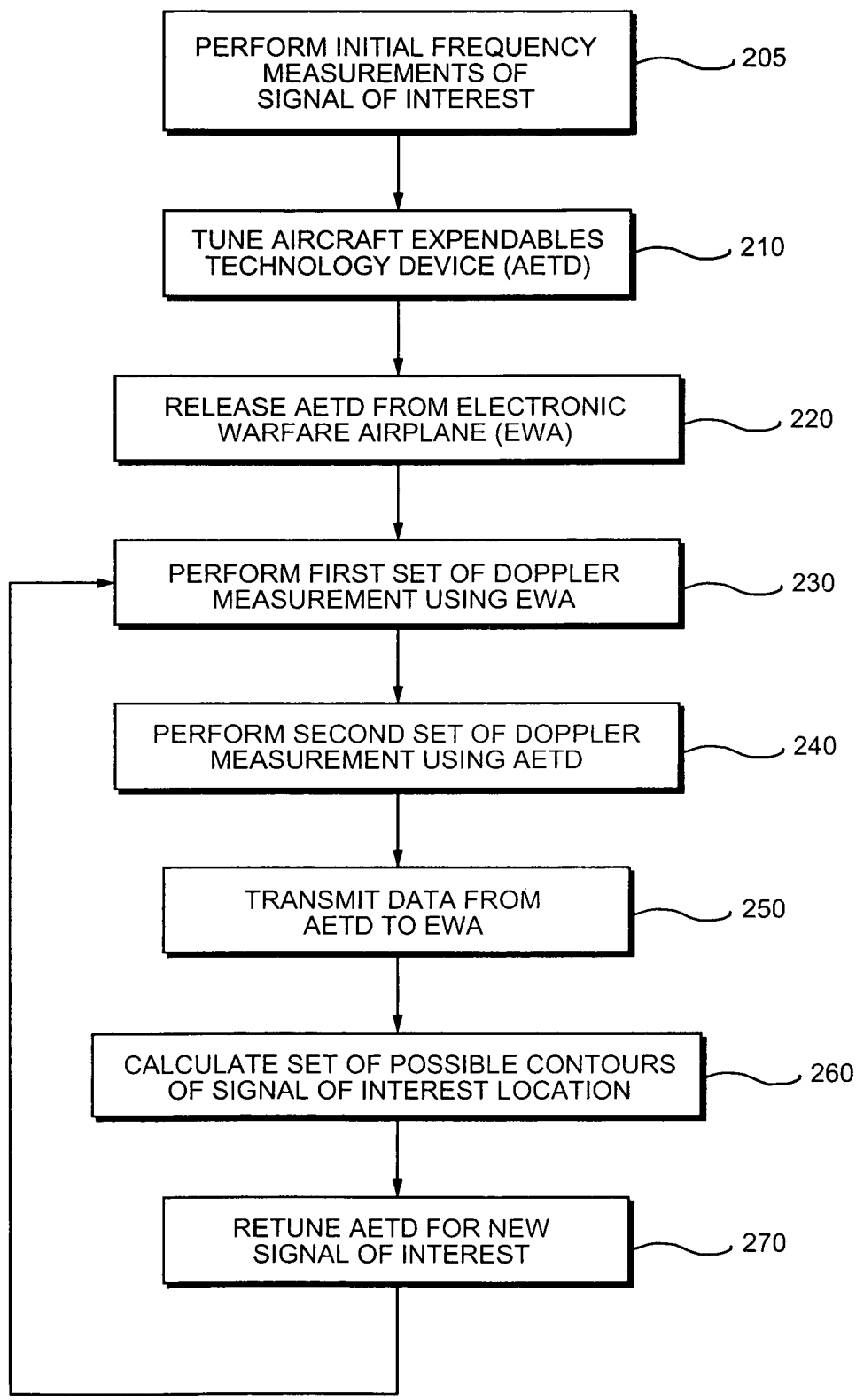
FIG. 3 is a flow chart illustrating one embodiment of the single platform geolocation method according to the present invention.

The present invention is a variant of the Differential Velocity Interferometry (DVI) technique, which is a Doppler based location method. The present invention relates to systems 1, FIG. 2, and methods 200, FIG. 3, for single platform geolocation. As will be explained in greater detail hereinbelow, an aircraft expendables technology device 12, FIG. 2, such as a drone aircraft or similar device, is ejected or released from an electronic warfare aircraft 10. The electronic warfare aircraft 10 and the aircraft expendables technology device 12 are in communication with each other and determine the Doppler measurement set(s) for the targeted aircraft 14 or other signal of interest. For purposes of this specification, targeted aircraft includes manned or unmanned aircrafts, missiles and the like.

The electronic warfare aircraft 10 includes an ejection port or release mechanism 22 for releasing the aircraft expendables technology device 12 from the electronic warfare aircraft 10 and a COMS signal transponder 13 or the like. The COMS signal transponder 13 is used to determine a Doppler measurement set for the targeted aircraft or signal of interest 14 using any method or device known to those skilled in the art. The electronic warfare aircraft 10 also preferably includes a transmitter 15 and a receiver 17 for establishing communications with the aircraft expendables technology device 12.

The aircraft expendables technology device 12, such as POET, IDECM, etc.), includes a receiver 16 and a transmitter 18 for establishing communication with the electronic warfare aircraft 10 as well as a processor 19. The aircraft expendables technology device 12 also includes a COMS signal transponder 11 or the like. As will be explained in greater detail hereinbelow, the COMS transponder 11 provides the second Doppler measurement set of the targeted aircraft 14 used to generate a set of possible contours that satisfies the location of the signal of interest 14.

The electronic warfare aircraft 10 preferably performs an initial frequency measurement of the targeted aircraft 14 or signal of interest, act 205. The aircraft expendables technology device's 12 COMS transponder 11 is tuned and programmed to the targeted aircraft 14 or signal of interest, act 210, FIG. 3. The COMS transponder 11 is preferably tuned and programmed prior to ejection/release from the electronic warfare aircraft 10, act 220, though may be tuned or returned as will be explained in greater detail hereinbelow.

Once the aircraft expendables technology device 12 is ejected from the electronic warfare aircraft 10, act 220, the electronic warfare aircraft 10 performs a first set of Doppler measurements, act 230. The aircraft expendables technology device 12 also performs at least a second set of Doppler measurements, act 240, and the second set of Doppler measurements is transmitted from the aircraft expendables technology device 12 to the electronic warfare aircraft 10, act 250. The first and second sets of Doppler measurements are then used to calculate a set of possible contours that satisfy the emitter location, act 260, using any method and device known those skilled in the art.

Figure 1:
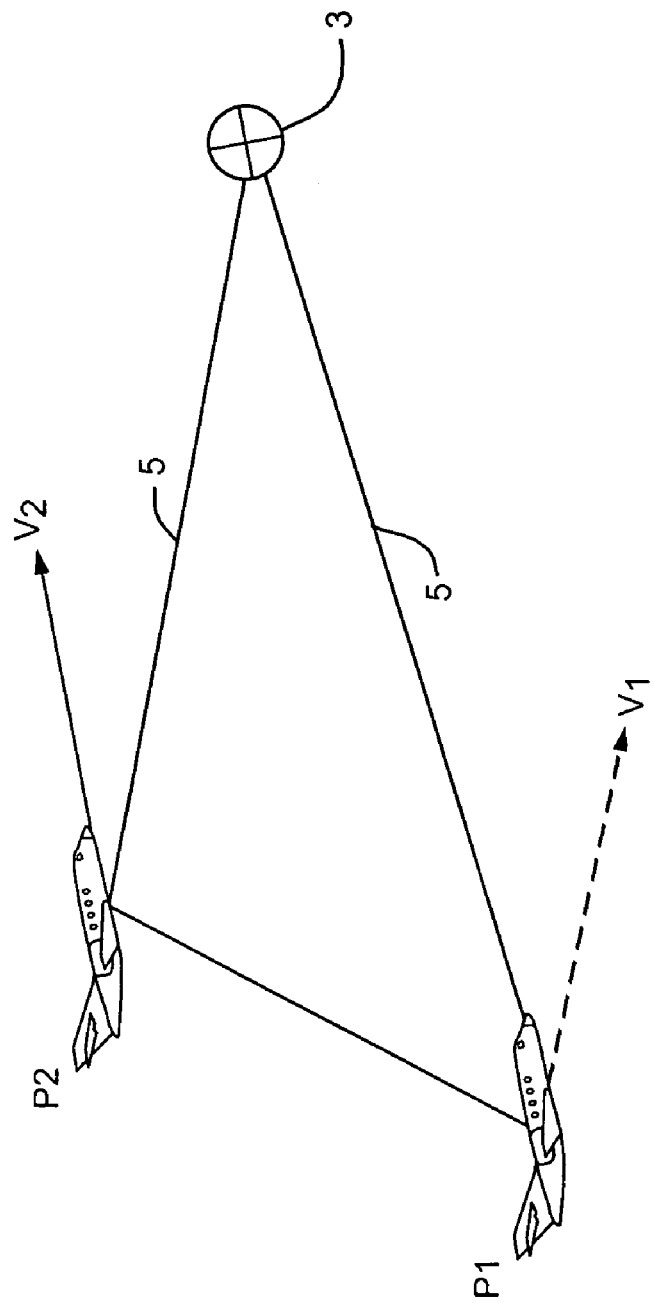
FIG. 1 is plan view illustrating the prior art two method of using two electronic warfare aircrafts.

As a result, the aircraft expendables technology device 12 takes the place of and replaces the second aircraft P2 (FIG. 1) that is required by the prior art method. As explained in the BACKGROUND OF THE INVENTION, a mission having two platforms (aircrafts) P1 and P2 (FIG. 1) is very expensive and complex. Further, the accuracy, proximate the platforms, is not good. In addition, the mission geometries, such as platform separation, platform coordination, and platform timing are difficult to control.

The aircraft expendables technology device 12 optionally includes a GPS receiver 19 for providing time and position reference information. The aircraft expendables technology device 12 has a short-term time reference, which is accurate. The short-term time reference could be from a clock or the time produced from the GPS. The time and position references are used for time difference of arrival (TDOA) measurements (i.e., the time interval separating the arrival of signals). The aircraft expendables technology device 12 preferably reports its flight position and time tagged signal of interest data to the electronic warfare aircraft 10. An on-board processor 20 in the electronic warfare aircraft 10 performs time difference of arrival geolocation computations.

In an alternative embodiment, telemetry between the electronic warfare aircraft 10 and the aircraft expendables technology device 12 is utilized to provide for re-tuning the receiver 16 in the aircraft expendables technology device 12 to multiple targeted aircraft 14 frequencies or signals of interest during its life, act 270. The method 200 then repeats itself as necessary.

The aircraft expendables technology device 12 may further include a parachute, air braking system, or the like 25 for slowing the descent of the aircraft expendables technology device 12 to the ground once the aircraft expendables technology device 12 has been released or ejected from the electronic warfare aircraft 10. The parachute or air braking system 25 increases the "hang time" or "air time" of the aircraft expendables technology device 12, thereby increasing the operation time of the single platform geolocation system 1 according to the present invention.

In the preferred embodiment, the aircraft expendables technology device 12 translates the frequency of the targeted aircraft 14 or the signal of interest to a new carrier frequency (e.g., 1 MHz or higher) and re-transmits it to the electronic warfare aircraft 10. In addition, a "pilot" frequency is transmitted from the aircraft expendables technology device 12 to the electronic warfare aircraft 10. The known "pilot" frequency provides a Doppler profile of the aircraft expendables technology device 12 from the time interval between its ejection from the release mechanism 22 of the electronic warfare aircraft 10 and its touch down on the ground. The re-transmitted signal of interest with its unique view of the signal of interest Doppler, together with the "pilot" Doppler, provide the electronic warfare aircraft 10 with the second Doppler data set for an emitter contour calculation.

An advantage of the present invention is that the receiving electronic warfare aircraft 10 is equipped to process both the re-transmitted frequency of the targeted aircraft 14 or signal of interest and the "pilot" frequency. Consequently, the electronic warfare aircraft 10 does not need to have additional receiving system hardware to process these signals.

In an alternative embodiment, the "pilot" frequency is modulated with a difference beat frequency between the frequency of the targeted aircraft 14 or the signal of interest and the "pilot" frequency. The electronic warfare aircraft 10 easily extracts the targeted aircraft 14 or signal of interest Doppler profile by direct measurement of the "pilot" modulation frequency.

In another alternative embodiment, the processor 19 of the aircraft expendables technology device 12 is measures the Doppler frequency shift between the initially programmed frequency and the received frequency of the targeted aircraft 14 or signal of interest. The aircraft expendables technology device 12 sends these numerical values back to the electronics warfare aircraft 10 via telemetry.

Accordingly, the present invention is less expensive and complex than the dual platform system. Further, the present invention has increased accuracy/large baseline, can track moving targets, needs no DF array and electronics, and requires only a single antenna, while the GPS provides an accurate platform location. As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A portable single platform geolocation method for determining a Doppler measurement set of a target of interest, comprising the acts of:
providing an electronic warfare aircraft having an aircraft expendables technology device on-board, within a signal range of the target of interest;
performing an initial frequency measurement of the target of interest via the electronic warfare aircraft;
tuning and programming a receiver in the aircraft expendables technology device based on the initial frequency measurement of the target of interest;
ejecting the aircraft expendables technology device from the electronic warfare aircraft into airspace within the signal of range of the target of interest;
determining a Doppler measurement set on the target of interest by the aircraft expendables technology device; and
transmitting the Doppler measurement set of the target of interest from the aircraft expendables technology device to the electronic warfare aircraft.

2. The portable single platform geolocation method according to claim 1, further comprising:
determining time and position references by the aircraft expendables technology device; and
transferring the time and position references from the aircraft expendables technology device to the electronic warfare aircraft.

3. The portable single platform geolocation method according to claim 2, further comprising utilizing the time and position references for determining a time difference of arrival measurement.

4. The portable single platform geolocation method according to claim 1, further comprising:
determining flight position and time tagged signal of interest data using the aircraft expendables technology device;
transferring the flight position and time tagged signal of interest data to the electronic warfare aircraft; and
performing time difference of arrival measurements on the time tagged signal of interest data by the electronic warfare aircraft.

5. The portable single platform geolocation method according to claim 1, further comprising re-tuning a receiver of the aircraft expendables technology device to a new target of interest in response to at least one received signal from the target of interest.

6. The portable single platform geolocation method according to claim 3, further comprising slowing the descent of the ejected expendables technology device.

7. The portable single platform geolocation method according to claim 3, further comprising translating a frequency of the target of interest to a new carrier frequency.

8. The portable single platform geolocation method according to claim 7, wherein the new carrier frequency is 1 MHz or higher.

9. The portable single platform geolocation method according to claim 7, further comprising transferring the translated frequency from the aircraft expendables technology device to the electronic warfare aircraft.

10. The portable single platform geolocation method according to claim 9, further comprising:
determining a pilot frequency via the aircraft expendables technology device; and
transferring the pilot frequency from the aircraft expendables technology device to the electronic warfare aircraft.

11. The portable single platform geolocation method according to claim 10, further comprising providing a Doppler profile from a time interval via the pilot frequency from the aircraft expendables technology device to the electronic warfare aircraft.

12. The portable single platform geolocation method according to claim 11, further comprising providing the electronic warfare aircraft with a second Doppler data set via the translated frequency and the pilot frequency Doppler for an emitter contour calculation.

13. The portable single platform geolocation method according to claim 12, further comprising calculating the emitter contour calculation.

14. The portable single platform geolocation method according to claim 13, further comprising processing the translated frequency of the target of interest and the pilot frequency.

15. The portable single platform geolocation method according to claim 13, further comprising modulating a difference beat frequency between the frequency of the target of interest and the pilot frequency.

16. The portable single platform geolocation method according to claim 15, further comprising determining a pilot modulation frequency.

17. The portable single platform geolocation method according to claim 13, further comprising measuring a Doppler frequency shift between the initial frequency and a received frequency of the target of interest.

18. The portable single platform geolocation method according to claim 1, wherein the target on interest includes an aircraft.

19. The portable single platform geolocation method according to claim 18, wherein the aircraft is manned.

20. The portable single platform geolocation method according to claim 18, wherein the aircraft is unmanned.

21. A method of performing geolocation from a single platform comprising the acts of:
ejecting an aircraft expendable technology device from a first aircraft;
performing a first set of Doppler measurements using hardware disposed on said first aircraft;
performing at least a second set of Doppler measurements using hardware disposed on said aircraft expendable technology device; and
transmitting said at least a second set of Doppler measurements from said aircraft expendable technology device to said first aircraft.

22. The method as claimed in claim 21 further including the acts of:
performing an initial frequency measurement of a signal of interest by said first aircraft; and
tuning a receiver disposed within said aircraft expendable technology device to said signal of interest in response to said initial frequency measurement by said first aircraft.

23. The method as claimed in claim 22 wherein said act of performing said at least a second set of Doppler measurements further includes translating said signal of interest to a new carrier frequency and transmitting said new carrier frequency to said first aircraft.

24. The method as claimed in claim 23 where said act of performing said at least a second set of Doppler measurements further includes transmitting an initial pilot frequency from said aircraft expendable technology device to said first aircraft.

25. The method as claimed in claim 24 further including the act of modulating said pilot frequency.

26. The method as claimed in claim 25 wherein said act of modulating said pilot frequency further includes modulating said pilot frequency with a difference beat frequency between said signal of interest and said initial pilot frequency.

27. The method as claimed in claim 26 wherein said first aircraft extracts a signal of interest Doppler profile by direct measurement of the modulated pilot frequency.

28. The method as claimed in claim 26 wherein said aircraft expendable technology device measures a Doppler frequency shift between an initial signal of interest and a received signal of interest and transmits said Doppler frequency shift to said first aircraft.

29. The method as claimed in claim 21 further including the act of slowing the descent of said aircraft expendable technology device.

30. The method as claimed in claim 21, further comprising:
   determining time and position references by said aircraft expendable technology device; and
   transferring said time and position references from said aircraft expendable technology device to said first aircraft.

31. The method as claimed in claim 30, further comprising utilizing said time and position references for determining a time difference of arrival measurement.

32. The method as claimed in claim 21, further comprising the feature of re-tuning a receiver of said aircraft expendable technology device to a new target of interest in response to at least one received signal from said target of interest.

33. A signal platform geolocation system comprises:
   a first aircraft including a first COMS transponder and a first receiver, said first COMS transponder generating a first set of Doppler measurements; and
   an aircraft expendable technology device releaseably secured to said first aircraft, said aircraft expendable technology device including a second COMS transponder and a first transmitter, wherein said second COMS transponder generates a second set of Doppler measurements and said first transmitter transmits data relevant to said second set of Doppler measurements from said aircraft expendable technology device to said first receiver of said first aircraft.

34. The system as claimed in claim 33 wherein said first aircraft includes a processor, wherein said processor generates an emitter contour based on said first set of Doppler measurements and said second set of Doppler measurements.

35. The system as claimed in claim 33 wherein said aircraft expendable technology device includes a time and position device.

36. The system as claimed in claim 33 wherein said first aircraft further includes a second transmitter, wherein said second transmitter transmits a returning signal to said aircraft expendable technology device.

37. The system as claimed in claim 33 wherein said aircraft expendable technology device further includes an air braking system.

38. The system as claimed in claim 33 wherein said aircraft expendable technology device includes a second processor that measures a Doppler frequency shift between an initially transmitted frequency and a received frequency of said signal of interest, and wherein said aircraft expendable technology device transmits data relevant to said Doppler frequency shift to said first aircraft.

* * * * *